US009375808B2

(12) United States Patent
Fikes et al.

(10) Patent No.: US 9,375,808 B2
(45) Date of Patent: Jun. 28, 2016

(54) WELDING AND CUTTING LASER DISPLACEMENT COMPENSATION SYSTEM

(71) Applicant: LINCOLN GLOBAL, INC., City of Industry, CA (US)

(72) Inventors: Jonathan V. Fikes, Reno, NV (US); Ryan Owens, Reno, NV (US); Dionysus Damato, Incline Village, NV (US); Dane Weiler, Cleveland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 470 days.

(21) Appl. No.: 14/027,655

(22) Filed: Sep. 16, 2013

(65) Prior Publication Data

US 2015/0076126 A1    Mar. 19, 2015

(51) Int. Cl.
*B23K 9/095*    (2006.01)
*B23K 9/127*    (2006.01)
*B23K 9/00*    (2006.01)

(52) U.S. Cl.
CPC ............... *B23K 26/044* (2015.10); *B23K 9/095* (2013.01); *B23K 9/0956* (2013.01); *B23K 9/1274* (2013.01); *B23K 9/00* (2013.01)

(58) Field of Classification Search
CPC ........ B23K 9/00; B23K 9/095; B23K 9/0956; B23K 9/1274
USPC ...................... 219/124.1, 124.21, 108, 124.4; 700/159, 259; 83/368, 74
See application file for complete search history.

(56) References Cited

U.S. PATENT DOCUMENTS

| 4,591,689 A * | 5/1986 | Brown et al. ........ B23Q 35/127 219/124.34 |
| 4,831,233 A * | 5/1989 | Gordon .................. B23K 9/095 219/124.34 |
| 5,015,821 A * | 5/1991 | Sartorio et al. ...... B23K 9/1274 219/124.34 |
| 2003/0062352 A1* | 4/2003 | Kislovsky et al. ....... B23K 9/04 219/130.21 |

* cited by examiner

*Primary Examiner* — Samuel M Heinrich
(74) *Attorney, Agent, or Firm* — Perkins Coie LLP

(57) ABSTRACT

A movement control system is provided for cutting and welding applications which uses a laser movement detection system to detect deflection or displacement in a guide rail movement system. A movement controller controls the movement of the cutting or welding operation based on the detected laser beam displacement.

18 Claims, 4 Drawing Sheets

WELDING AND CUTTING LASER DISPLACEMENT COMPENSATION SYSTEM

TECHNICAL FIELD

Devices, systems, and methods consistent with the invention relate to welding and cutting, and more specifically to devices, systems and methods for welding and cutting using a laser displacement system.

BACKGROUND

In many large or industrial welding and cutting operations it is desirable to use a tractor drive unit to carry the welding or cutting device, where the tractor drive unit is mounted on rails or guides which control the movement of the tractor unit. That is, typically, the rails or guides keep the tractor unit, and this the welding/cutting device, following a desired line to ensure that the welding or cutting operation follows a desired path. However, in many instances the rails or guides can become warped bent or otherwise cause the welding and cutting operation to deviate from its desired route, causing a defective operation. Some systems exist which track the weld or cutting joint to control the operation of the welding/cutting operation, but very little is done to compensate for deviations in the rails/guides.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a movement control system for a cutting or welding operation. The system has at least one guide rail, and a movement mechanism coupled to the at least one guide rail, where the movement mechanism moves along a length of the at least one guide rail. A gantry rail is coupled to the movement mechanism, and a torch holding mechanism coupled to the gantry rail, where the torch holding mechanism is movable along the gantry rail. A laser beam detection device is coupled to one of the movement mechanism and the torch holding mechanism, and a laser device directs a laser beam at the laser beam detection device such that the laser beam impacts the detection device during movement of the movement device. A movement controller controls a movement of the torch holding mechanism along the gantry rail, and the movement controller is coupled to the laser beam detection device so as to detect a movement of the laser beam along a surface of the laser beam detection device. The movement controller controls the movement of the torch holding mechanism to compensate for the detected movement of the laser beam along the surface.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
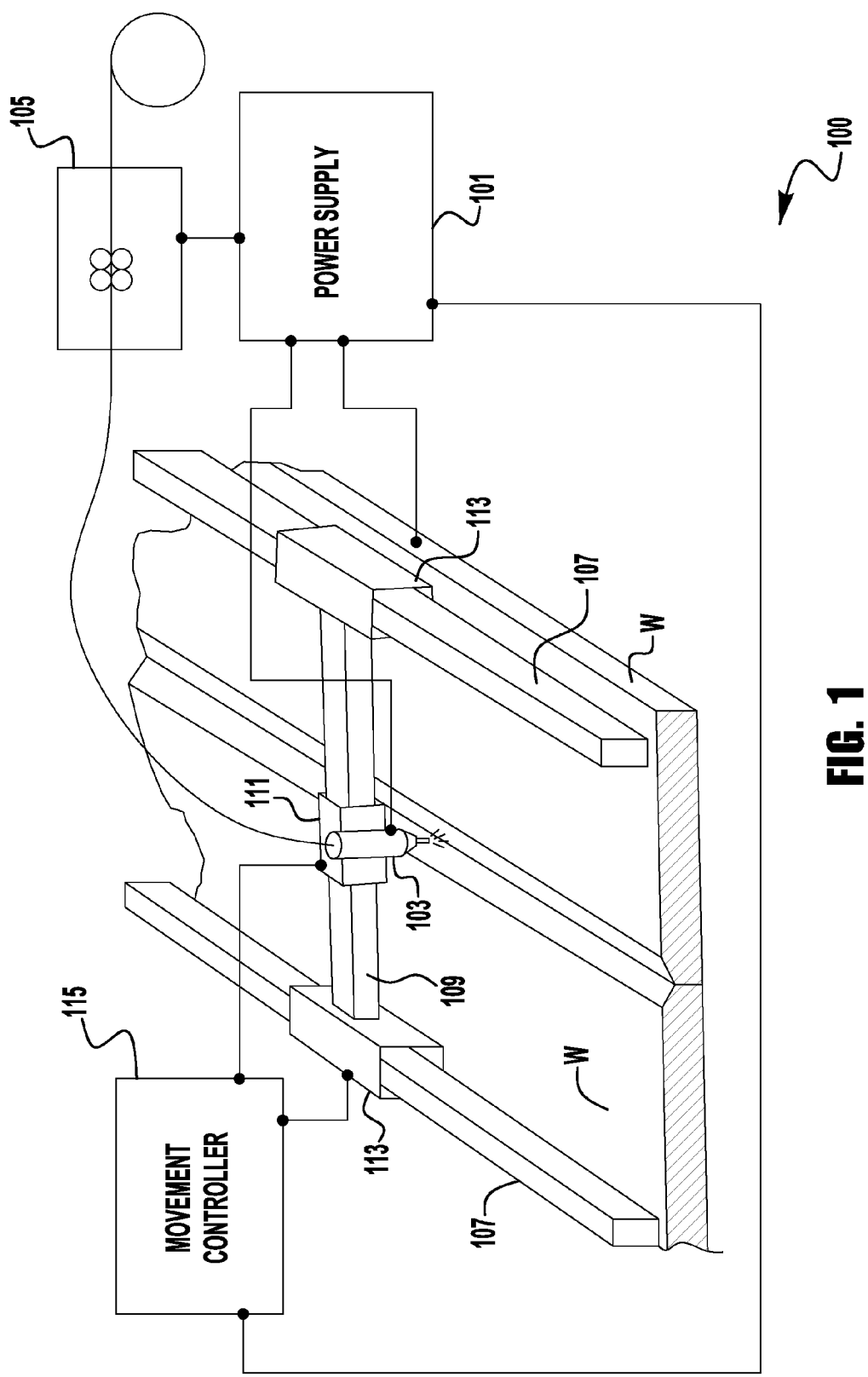
FIG. 1 illustrates an exemplary embodiment of a rail/guide system which can be used with embodiments of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts a diagrammatical representation of an exemplary embodiment of a tractor and guide system 100 that can be utilized with embodiments of the present invention. For purposes of clarity and simplicity the system 100 is depicted with simple representations of various known components. Further, for purposes of efficiency the following discussion will generally be directed to and refer to a welding system, however, embodiments of the present invention can also be used with many different types of systems and operations without departing from the spirit or scope of the present invention. Such operations include, but are not limited to, cutting, brazing, cladding, overlaying, etc.

The system 100 includes a power supply 101 which provides a current to a torch 103 to perform the desired operation. In FIG. 1, the depicted operation is welding and as such the power supply 101 is capable of providing a welding current to the torch 103. Of course, as noted herein the power supply 101 can be any one of many other types of power supplies, such as cutting, cladding, brazing, etc. In the system 100 shown, the power supply 101 is also coupled to a wire feeder 105 which provides a consumable for a welding operation. As shown in the exemplary system 100 in FIG. 1 a rail or guide system using rails 107 is employed. Spanning the rails 107 is a gantry rail 109 onto which a torch holding mechanism 111 is mounted. The gantry rail 109 is coupled to the rails 107 with roller mechanisms 113. At least one of the roller mechanisms 113 and the torch holding mechanism 111 are coupled to a movement controller 115 which controls the movement of the torch 103 during operation. Specifically, during operation the torch 103 can be moved along the weld groove in any desired direction to achieve a desired weld path. Such motion control is generally known and understood and need not be described in detail. Further, rail and gantry systems are also generally known and need not be described in detail herein. It should be noted that embodiments of the present invention are not limited to the configurations shown in FIG. 1, and many other configurations can be used without departing from the spirit and scope of the present invention.

During operation the movement controller 115 controls the movement of the torch 103 by moving the torch 103 along the rail 109 and moving the rail 109 along the rails 107. The movement is generally intended to guide the torch 103 along the groove G to weld the workpieces W. Each of the torch holding mechanism 111 and the roller mechanisms 113 contain movement mechanisms such as rollers and motors to provide for the movement along the rails. Such movement mechanisms are generally known and need not be described in detail. Many different types of movement mechanisms or devices can be used without departing from the spirit and scope of the present invention.

When welding (or conducting other operations) it is desirable to keep the torch 103 positioned appropriately relative to the groove G, it may also be desired to move the torch 103 in a desired pattern to achieve a desired result. However, due to anomalies or inconsistencies in the workpieces W or in the groove G inconsistencies in the weld (or other operation) can be created. Furthermore, although it is desirable that the rails 107 be straight to provide a consistent, predictable path in many instances the rails 107 can be bent or deformed. This can occur from manufacturing defects, worksite damage, and/or general distortion over long lengths of the rails 107. Many current groove alignment systems are incapable of compensating accurately due to anomalies or deflections in the rails 107. Embodiments of the present invention, discussed in more detail below, address these inadequacies.

Figure 2:
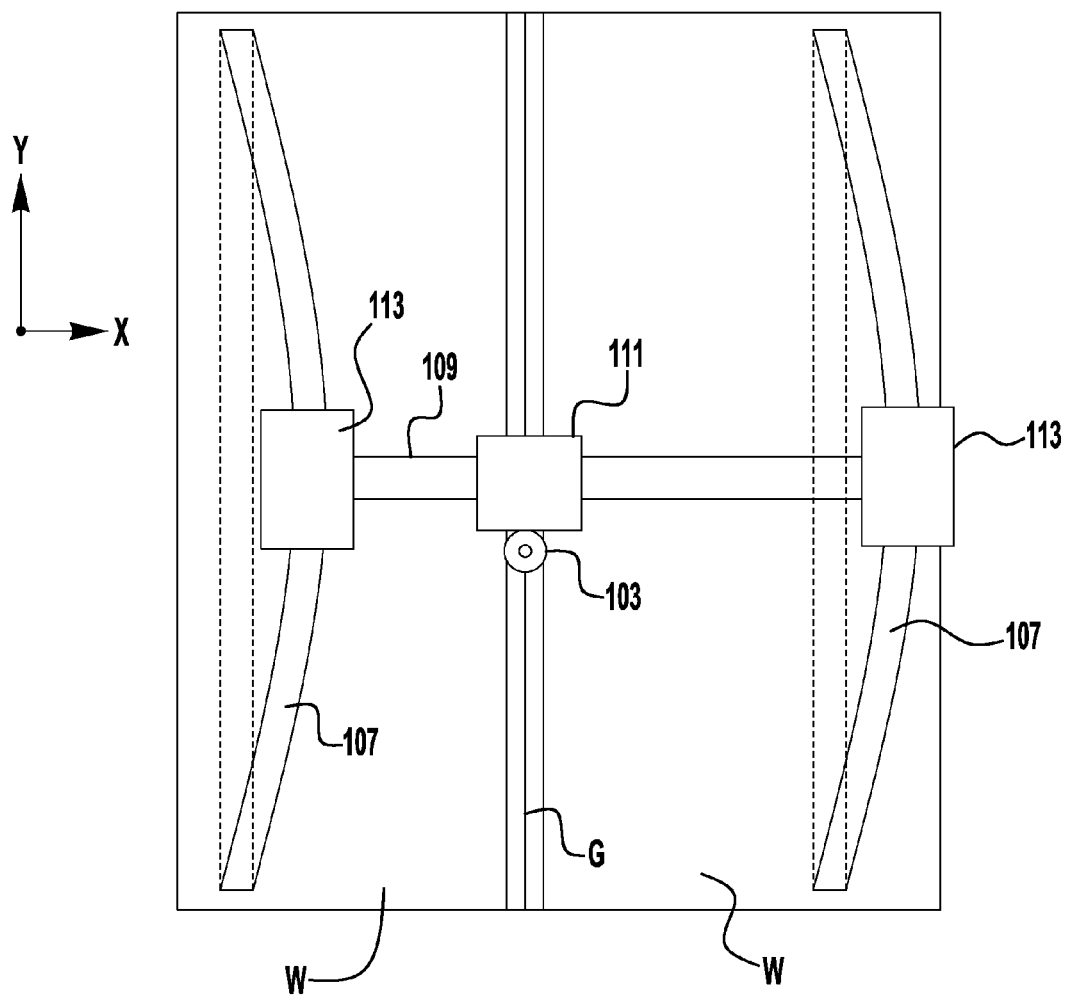
FIG. 2 illustrates an exemplary embodiment of a deformed rail/guide system.

FIG. 2 depicts a top down view of the embodiment shown in FIG. 1 with a deflection depicted in the rails 107. As can be seen the deflection in the rails 107 can cause the torch 103 to be displaced relative to a desired location.

Figure 3:
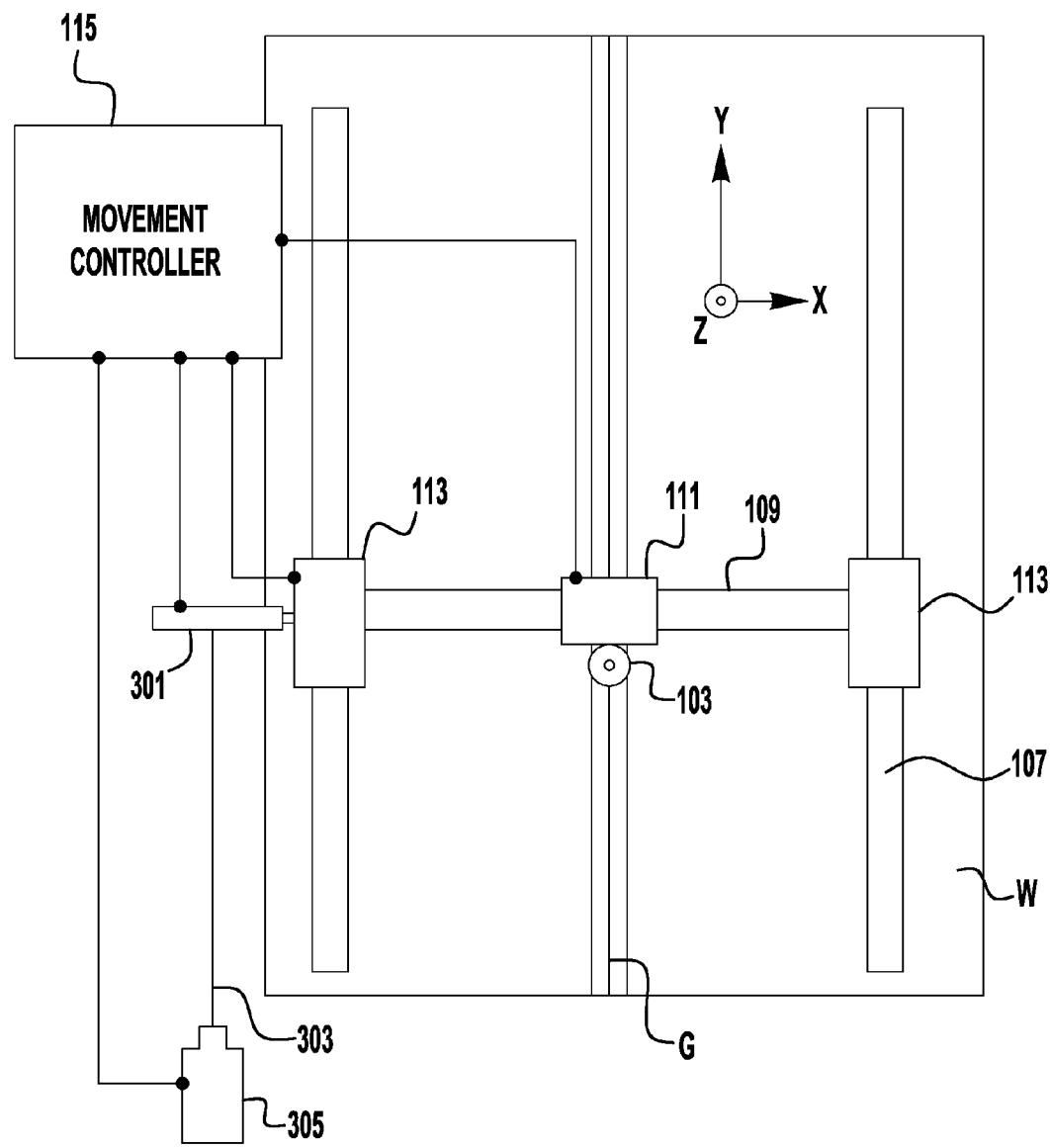
FIG. 3 illustrates an exemplary embodiment of a system of the present invention.

FIG. 3 is another top down view of the system 100 which shows a laser sensor window 301 fixedly mounted to one of the roller mechanisms 113. The laser sensor window 301 can be of any known type of laser sensor window which can be used to detect displacement and movement. The laser sensor window 301 is of a type that can receive a laser beam 303 and determine the location and movement of the beam 303 along a surface of the sensor window 301 in at least one direction, and in some embodiments in at least two directions. The sensor window 301 then provides a positional signal representative of the impact position, and thus movement, of the beam 303 along its sensor surface. During operation a laser beam 303 is emitted from a laser 305 towards the window 301. Because the window 301 is secured to the roller mechanism 113, if there is a deflection in the rail 107 the deflection will be detected by the window 301. The window 301 than sends a deflection signal to the movement controller 115 which controls the movement of the torch 103 and adjusts the positioning of the torch appropriately. Such a system can detect the slightest deflection in the rails 107 and the system 100 can adjust for that deflection and keep the torch 103 on the desired path. For example, if the window 301 detects a deflection of 0.25 inches that deflection is sent to the controller which moves the torch 103 0.25 inches to compensate for the rail deflection. Because of the sensitivity of the window 301 the adjustments can be made to the torch 103 position at real time thus allowing the system to account for the smallest variations in rail deflection during operation.

The laser 305 is to be mounted at a location which allows it to impact the window 301 during the desired operation, and it should be mounted at a location not to be influenced by the movement of the torch 103 or any deflection in the rails 107. In embodiments of the present invention, the window 301 and movement controller 115 only detect and correct displacements along a single axis (shown x-axis). However, in other exemplary embodiments the window 301, laser 305 can detect speed changes along the y axis and change the travel speed along the rails 107 to maintain a desired speed setting. In other exemplary embodiments, embodiments of the present invention utilize feedback from a motor (not shown) in the at least one of the roller mechanisms which is used to drive the assembly along the tracks/guides 107. For example, the motor speed can be used to determine the speed of the assembly. However, due to some types of mechanical failures the motor speed may not accurately reflect the actual travel speed (e.g., due to slippage) and in such embodiments the laser can be used to monitor speed. Other types of speed sensors can also be used to provide a speed feedback signal to the movement controller and/or power supply.

For example, there can be anomalies, defects or obstacles that obstruct movement along the rails 107 and the system can detect speed changes during the process to allow the controller 115 to compensate for the speed changes. In some exemplary embodiments, the controller 115 monitors the speed sensed by the window 301 and/or a rate of change of the speed (in the y-direction) to determine if the speed is falling below a desired threshold, which means that the process is inadvertently stopping or being restricted, and once the threshold is reached or passed the controller 115 causes the operation (welding, etc.) to stop so that the workpiece is not damaged due to the slow down. For example, the controller 115 can store a threshold speed or rate of change threshold for a given operation which would indicate a level past which the welding performance would be diminished and it is more advantageous to stop the operation than preceding. Thus, rather than waiting for the torch to stop moving along the y-axis, embodiments of the present invention can detect an imminent stoppage or a slow down and stop welding before the stoppage actually occurs. For example, by monitoring the rate of change of the speed along the y-axis the controller 115 can determine that a stoppage is imminent and stop the process before the actual stoppage can occur. In some exemplary embodiments the speed and/or rate of change threshold setting can be based on a user input. That is, a user can input data, such as travel speed and other information related to the process, and the controller 115 can use this information to determine a speed threshold and/or a rate of change threshold for the operation. In other embodiments, the threshold levels can be direct user inputs.

Figure 4:
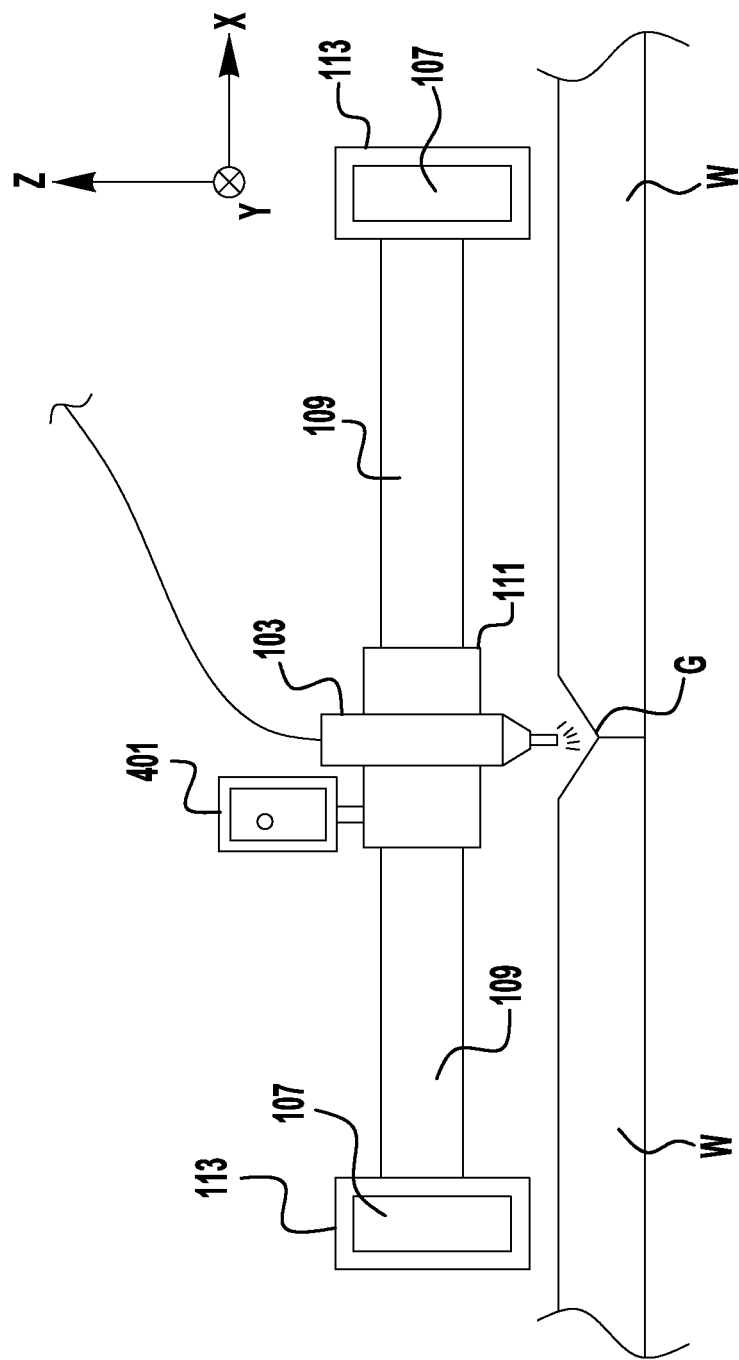
FIG. 4 illustrates an another exemplary embodiment of a system of the present invention.

FIG. 4 depicts another exemplary embodiment of the present invention, where a laser sensor window 401 is secured to the torch holding mechanism 111. In this embodiment, the window 401 is used to detect deflections along the z-axis, in a similar way as to described above for the x-axis. The window 301 in FIG. 3 can also be used to detect deflections along the Z-axis, but because of the distance from the torch 103, the deflection may not be representative of the actual z-axis deflection. Thus, in some embodiments a sensor window 401 can be mounted on the mechanism to provide a more actual deflection measurement of the torch 103. The deflection information detected by the window 401 is used by the controller to adjust the height of the torch 103 as needed during an operation. That is, in some exemplary embodiments the mechanism 111 can have a height adjustment mechanism (not shown) connected to the torch 103 so that the controller 115 can change the height of the torch as needed. For example, a screw drive mechanism, gear and motor mechanism, or any other known mechanism, can be used to raise or lower the height of the torch 103 during operation. During operation, one of the rails 107 could be bent or distorted in the z direction which would cause the torch 103 to be vertically displaced during the process. For example, in a welding operation such a deflection could change to stick out to an undesirable level. The window 401 detects this deflection and this detected information is sent to the controller 115. The controller 115 then causes the height of the torch 103 to be adjusted using a height adjustment mechanism (not shown) mounted to the mechanism 111. Thus, embodiments of the present invention are capable of keeping the torch 103 at a stationary level in the z direction if anomalies or deflections exist in the rails or elsewhere. Of course, it should be noted that to the extent the mechanism 111 moves the torch 103 significantly in the X direction during the operation, the laser (not shown) which is directing its beam to the window 401 should move with the window 401 to prevent the window 401 from moving outside of the beam.

In further exemplary embodiments, the system 100 can use the window 401 for detecting displacement in each of the x and y directions, as well as undesired speed changes. By using the window 401 mounted on the mechanism 111 for correction in at least two directions, embodiments of the present invention can detect changes or deflections at the mechanism 111 which can accurately reflect deflections at the torch 103. Further, to the extent the torch 103 is desired to move in the x direction during an operation, the window 401 and controller 115 can help control that movement and ensure that the movement is as desired.

In other exemplary embodiments, a plurality of sensor windows 301/401 can be utilized at various locations to detect any undesired movement. For example, an embodiment of the system 100 can use a combination of the systems shown in FIGS. 3 and 4 to detect all, or any combination of deviations in each of the x, y and z directions.

Further, embodiments of the present invention can use deflection limits to determine whether or not to stop an operation. That is, embodiments can use similar control methodology as that discussed above regarding movement in the y direction. For example, embodiments of the present invention can utilize deflection thresholds in either (or both) of the x and z direction and if the detected deflection is beyond the limits the controller 115 will cause the operation to stop, thus preventing the operation from operating outside of acceptable limits. Further, exemplary embodiments can similar monitor the rate of change of the position in either (or both) of the x and z directions and stop the operation if the rate of change is exceeded. Such embodiments can aid in preventing an operation from continuing when the rate of change of detected deflection is faster than that at which the mechanical systems can recovery.

Specifically, because the movement of the torch 103 during an operation is primarily driven by mechanical connections and motors, there is a limit to the speed at which adjustments can be made to the positioning of the torch 103. Because of these limits, it may not be possible for the system 100 to properly adjust to deflections that occur at faster rates then the mechanical adjustment rates. That is, the torch 103 repositioning, by the controller 115, may fall behind the actual deflections occurring to the torch 103. Embodiments of the present invention can stop the operation when those mechanical limits are reached or exceeded. In such embodiments the controller 115 stores rate of change threshold limits for torch movement in each of the x and z direction. The threshold limits can be preset based on the various movement mechanisms used by the system 100 to provide movement of the torch 103. For example, a user can input data into the controller 115 related to the types of components used for the system 100 and/or the user can input data related to an acceptable rate of change for the operation. In other exemplary embodiments, each of the movement mechanisms, such as the roller mechanisms 113 and torch movement mechanism 111, can be recognized by the controller 115 when connected to the controller such that the controller can automatically determine the appropriate rate of change thresholds for each of those mechanisms (from a look-up table, or the like) and set those rates of change for a given operation. Such automatic recognition can be accomplished by using electrical connections, such as USB, or the like, and driver software for each of the mechanisms. Of course, other methodologies can be employed to implement automatic mechanism recognition by the controller 115. During operation, the controller 115 uses the set rate of change thresholds for each of the x and z to compare with the detected rates of change—which are detected through the use of the windows 301/401. When the detected rate of change exceeds the set thresholds, the controller 115 stops the operation.

For example, when a mechanism 111 is coupled to the controller 115 via an electrical connection (or is programmed in via a user input) the controller 115 recognizes that the mechanism 111 has a maximum effective rate of change of 5 in/s$^2$ and when the detected rate of change of the torch 103 (via the window 301 or 401) reaches or exceeds that rate of change, the controller 115 stops the operation.

In other exemplary embodiments, the controller 115 can use a maximum speed threshold in either (or both) of the x and z directions. That is, like the embodiments described above a maximum speed can be set by the controller 115 for each direction (x, z) and if that speed is exceeded the controller 115 can stop the operation. The operation of such embodiments would be similar to that described above, except using a speed threshold instead of a rate of change threshold. Of course, some embodiments of the present invention can use a combination of speed and rate of change thresholds to control the operation of the system 100.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A movement control system for a cutting or welding operation, said system comprising:
    at least one guide rail;
    a movement mechanism coupled to said at least one guide rail, where said movement mechanism moves along a length of said at least one guide rail;
    a gantry rail coupled to said movement mechanism;
    a torch holding mechanism coupled to said gantry rail, where said torch holding mechanism is movable along said gantry rail;
    a laser beam detection device coupled to one of said movement mechanism and said torch holding mechanism;
    a laser device which directs a laser beam at said laser beam detection device such that said laser beam impacts said detection device during movement of said movement device; and
    a movement controller which controls a movement of said torch holding mechanism along said gantry rail,
    wherein said movement controller is coupled to said laser beam detection device so as to detect a movement of said laser beam along a surface of said laser beam detection device, and wherein said movement controller controls the movement of said torch holding mechanism to compensate for the detected movement of said laser beam along said surface.

2. The system of claim 1, wherein said detected movement of said laser beam is caused by a defect in said at least one guide rail.

3. The system of claim 1, wherein said movement controller controls a movement of both of said movement mechanism and said torch holding mechanism.

4. The system of claim 1, comprising at least two guide rails.

5. The system of claim 1, wherein said movement controller, said laser device and said laser detection device control the movement of said torch holding mechanism so as to maintain the position of a torch over a weld joint or cutting line.

6. The system of claim 1, wherein said movement controller detects a movement of said laser beam on said surface of said laser beam detection device in at least two axis and said movement controller controls said movement mechanism and said torch holding mechanism in response to said detection.

7. The system of claim 1, wherein the movement controller has at least one predetermined deflection threshold limit and if said detected movement of said laser beam on said laser beam detection device exceeds said at least one predetermined deflection threshold limit said movement controller stops an operation.

8. The system of claim 1, wherein a second laser beam detection device is coupled to said torch holding mechanism and a second laser device directs a second laser beam to said second laser beam detection device and at least said second laser beam detection device is coupled to said movement controller.

9. A movement control system for a cutting or welding operation, said system comprising:
   at least one guide rail;
   a movement mechanism coupled to said at least one guide rail, where said movement mechanism moves along a length of said at least one guide rail;
   a gantry rail coupled to said movement mechanism;
   a torch holding mechanism coupled to said gantry rail, where said torch holding mechanism is movable along said gantry rail;
   a laser beam detection device coupled to one of said movement mechanism and said torch holding mechanism;
   a laser device which directs a laser beam at said laser beam detection device such that said laser beam impacts said detection device during movement of said movement device; and
   a movement controller which controls a movement of said torch holding mechanism along said gantry rail,
   wherein said movement controller is coupled to said laser beam detection device so as to detect a movement of said laser beam along a surface of said laser beam detection device and a speed of said movement of said laser beam along said surface, and wherein movement controller controls the movement of said torch holding mechanism to compensate for the detected movement and detected speed of said laser beam along said surface.

10. The system of claim 9, wherein said detected movement of said laser beam is caused by a defect in said at least one guide rail.

11. The system of claim 9, wherein said movement controller controls a movement of both of said movement mechanism and said torch holding mechanism.

12. The system of claim 9, comprising at least two guide rails.

13. The system of claim 9, wherein said movement controller, said laser device and said laser detection device control the movement of said torch holding mechanism so as to maintain the position of a torch over a weld joint or cutting line.

14. The system of claim 9, wherein said movement controller detects a movement of said laser beam on said surface of said laser beam detection device in at least two axis and said movement controller controls said movement mechanism and said torch holding mechanism in response to said detection.

15. The system of claim 9, wherein the movement controller has at least one predetermined deflection threshold limit and if said detected movement of said laser beam on said laser beam detection device exceeds said at least one predetermined deflection threshold limit said movement controller stops an operation.

16. The system of claim 9, wherein a second laser beam detection device is coupled to said torch holding mechanism and a second laser device directs a second laser beam to said second laser beam detection device and at least said second laser beam detection device is coupled to said movement controller.

17. The system of claim 9, wherein said movement controller has a predetermined speed threshold and when said detected speed exceeds the speed threshold the movement controller stops an operation.

18. The system of claim 9, wherein said movement controller has a predetermined speed threshold and when said detected speed falls below the speed threshold the movement controller stops an operation.

* * * * *